United States Patent [19]
Nitta

[11] Patent Number: 5,084,761
[45] Date of Patent: Jan. 28, 1992

[54] VIDEO CAMERA WITH ROTATABLE COLOR FILTER AND REGISTRATION CORRECTION

[75] Inventor: Keiichi Nitta, Kawasaki, Japan
[73] Assignee: Nikon Corporation, Tokyo, Japan
[21] Appl. No.: 641,516
[22] Filed: Jan. 15, 1991

[30] Foreign Application Priority Data

Jan. 23, 1990 [JP] Japan ............................. 2-13362

[51] Int. Cl.⁵ .................................................. H04N 9/04
[52] U.S. Cl. ................................................ 358/41; 358/42
[58] Field of Search ........................ 358/41, 42, 43, 44, 358/55, 51, 98

[56] References Cited

U.S. PATENT DOCUMENTS 4,085,421 4/1978 Gilhour ................................. 358/81
4,887,153 12/1989 Uehara et al. ......................... 358/98
4,947,246 8/1990 Kikuchi ................................. 358/98
4,967,264 10/1990 Parulski et al. ....................... 358/44

Primary Examiner—Victor R. Kostak
Assistant Examiner—Tuan V. Ho
Attorney, Agent, or Firm—Shapiro and Shapiro

[57] ABSTRACT

In a color camera in which each time a rotatable filter is changed over to the positions of the filter portions of R, G and B, the reading operation of an image pickup device is performed to thereby output video signals of primary colors successively, there is provided registration correcting means for varying the scanning start point when each primary color video signal is read so as to eliminate the color misregistration when a color image is reproduced on the basis of the video signals of primary colors R, G and B.

3 Claims, 9 Drawing Sheets

R

G

B

R

G

B

ONE HORIZONTAL SCANNING PERIOD

ONE FIELD EFFECTIVE PERIOD

F I G. 8A
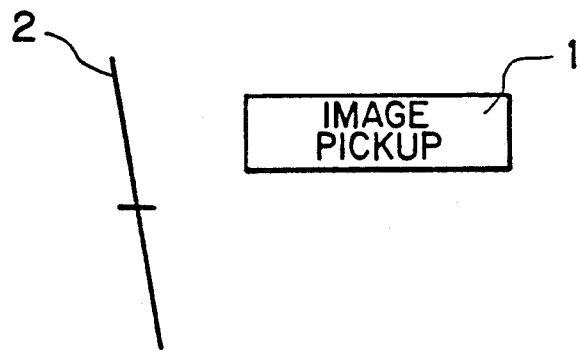
F I G. 8B
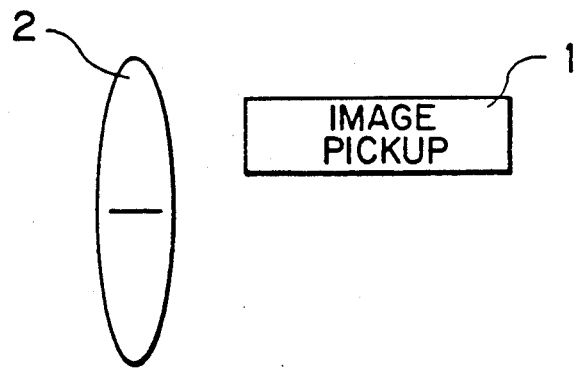
F I G. 8C
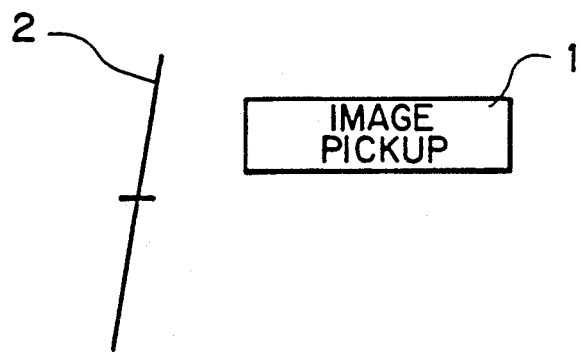

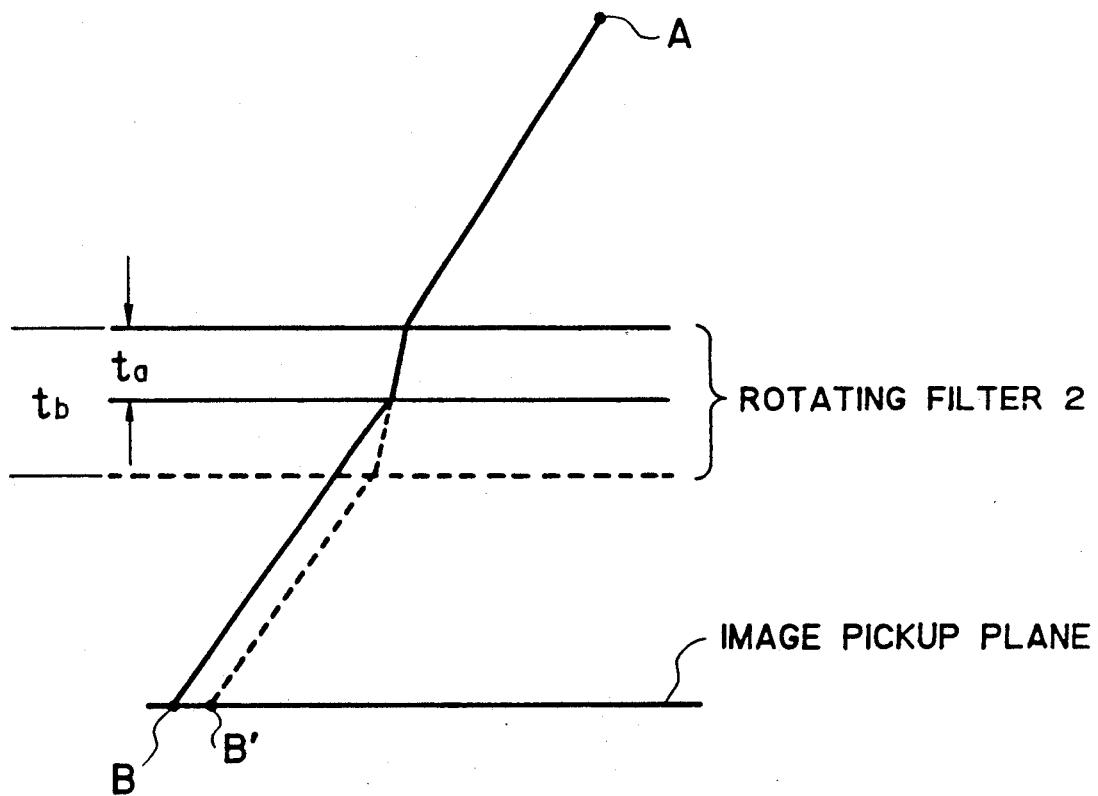

VIDEO CAMERA WITH ROTATABLE COLOR FILTER AND REGISTRATION CORRECTION

BACKGROUND OF THE INVENTION

1. Field of the Invention

This invention relates to a successive plane type color camera which uses a rotatable color filter and a single image pickup device to successively output video signals of primary colors R, G and B, and in particular to a successive plane type color camera endowed with the registration correcting function which eliminates color misregistration during reproduction.

2. Related Background Art

A successive plane type color camera is such that as shown in FIG. 6 of the accompanying drawings, a rotatable filter 2 installed in front of the image pickup surface of an image pickup device 1 such as an image pickup tube or a solid state image pickup element is rotated, whereby video signals of three primary colors, i.e., red, green and blue (hereinafter referred to as "R, G and B") are output successively. That is, video signals of R, G and B are successively output from the image pickup device 1, as shown in FIG. 7 of the accompanying drawings. FIG. 7 is simplified as by omitting the horizontal retrace line period of scanning.

Now, in the successive plane type color camera, image pickup is effected by the single image pickup device 1 and therefore, the color misregistration when a color picture plane is reproduced on the basis of the video signals of three primary color does not exist in principle and registration correction for preventing color misregistration is not necessary.

However, the fact that the angle of mounting of the rotatable filter 2 is not perpendicular to a rotary shaft and the non-uniformity of the thickness (t) of the material forming the rotatable filter 2 may cause the occurrence of color misregistration.

FIGS. 8A, 8B and 8C of the accompanying drawings show, with time, the manner in which the filter 2 is rotated when the video signals of the primary colors R, G and B in a case where the rotatable filter 2 is not mounted perpendicularly to the rotary shaft, and as shown there, the distance between the rotatable filter 2 and the image pickup surface and the relative angle between the rotatable filter 2 and the image pickup surface differ when the video signals of the primary colors R, G and B are introduced, and as a result, color misregistration occurs.

FIG. 9 of the accompanying drawings shows the course of a light ray transmitted through a rotatable filter 2 having different thicknesses ta and tb. This course can be primarily found from the refractive indices of air and the material forming the rotatable filter 2.

Light emitted from one end and the same light source A is image-picked up at different points B and B' because of the different thicknesses ta and tb of the material forming the rotatable filter 2 and as a result, color misregistration occurs.

Thus, even the successive plane type color camera in which color misregistration does not occur in principle has actually suffered from the problem that color misregistration occurs.

SUMMARY OF THE INVENTION

The present invention has been made in view of such a problem peculiar to the prior art, and the object thereof is to provide a successive plane type color camera designed such that registration correction for eliminating the color misregistration during reproduction is effected when video signals of primary colors R, G and B are read.

To achieve this object, the present invention is constructed as follows. Reference numerals in the accompanying drawings which show an embodiment of the present invention are also shown below.

First, the present invention is directed to a successive plane type color camera in which each time a rotatable filter 2 is changed over to the positions of the filter portions of R, G and B, the reading operation of an image pickup device 1 is performed to thereby output video signals of primary colors successively.

In a sucessive plane type color camera provided with such a rotatable filter 2 and a single image pickup device 1, according to the present invention, there is provided registration correcting means 3 for varying the scanning start point when each primary color video signal is read so as to eliminate the color misregistration when a color image is reproduced on the basis of the video signals of primary colors R, G and B.

Here, where an image pickup tube is used as the image pickup device 1, said registration correcting means 3 is designed so as to independently add a registration correcting waveform to a deflection waveform during the reading of each primary color video signal by the image pickup tube.

According to the successive plane type color camera of the present invention provided with such a construction, the starting point of reading and scanning of accumulated charges accumulated on the image pickup surface is independently controlled for each of screens of R, G and B, whereby there are obtained video signal outputs of R, G and B spatially moved so as to eliminate color misregistration on the image pickup surface attributable to the non-uniformity of the thickness and flatness of the rotatable filter, the mounting accuracy of the rotatable filter, etc.

BRIEF DESCRIPTION OF THE DRAWINGS

FIGS. 8A, 8B and 8C illustrate the relative position of an image pickup device and a rotatable filter when the rotatable filter is not regularly mounted.

FIG. 9 illustrates the occurrence of color misregistration caused by the non-uniformity of the thickness of the rotatable filter.

DETAILED DESCRIPTION OF THE PREFERRED EMBODIMENTS

Figure 1:
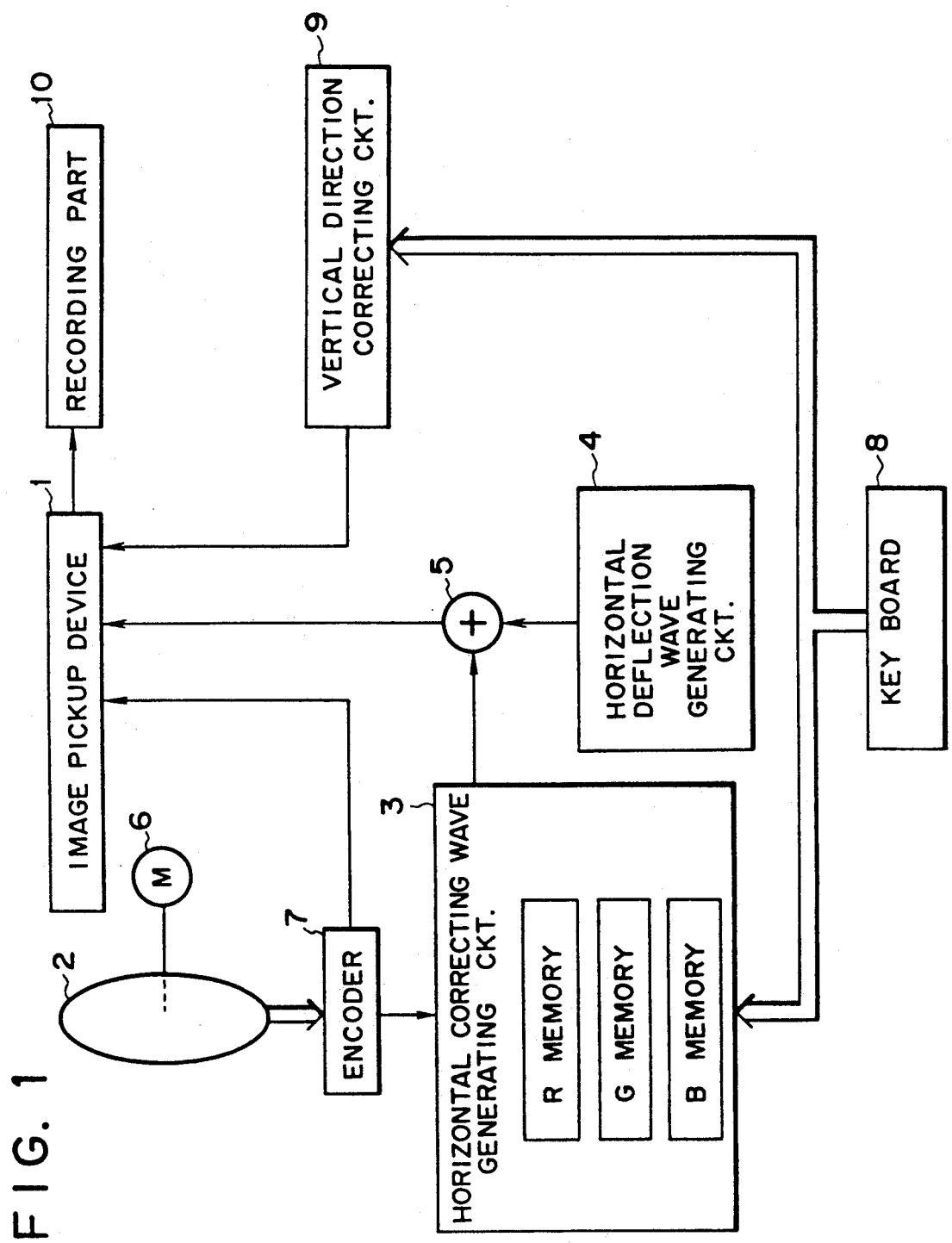
FIG. 1 is a block diagram showing the construction of an embodiment of the present invention.

Referring to FIG. 1, a rotatable filter 2 provided with filter portions R, G and B is disposed in front of the image pickup surface of an image pickup device 1 using an image pickup tube. The filter 2 is rotated at a predetermined speed by a motor 6, and an encoder 7 outputs a signal conforming to the rotated position of the filter, and the image pickup device 1 reads accumulated charges corresponding to one picture plane of each filter portion in synchronism with the timing at which the filter portions R, G and B are positioned in front of the image pickup surface on the basis of the signal of the encoder 7, and successively outputs video signals of primary colors in order of R, G and B. Further, the image pickup surface of the image pickup device 1 is wider than the area in which an electron beam is actually scanned.

Figure 5A:
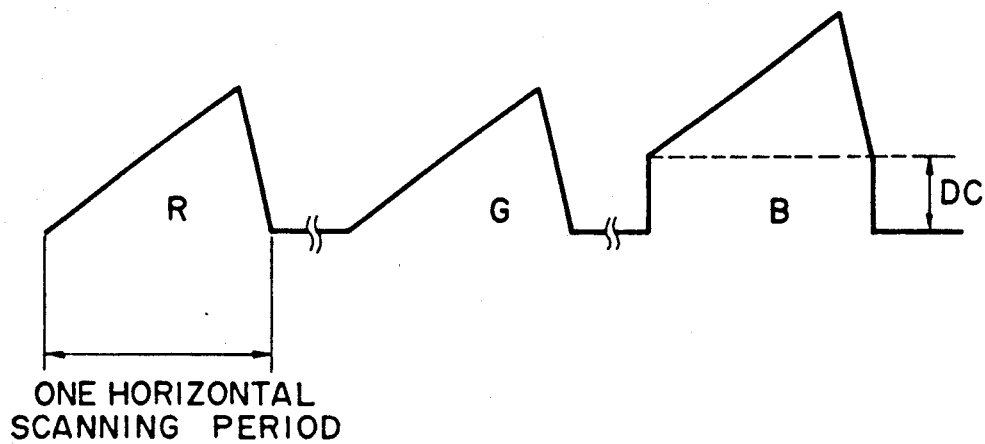
FIG. 5A shows a deflection waveform for the horizontal registration correction according to the present invention.

A horizontal deflection wave generating circuit 4 is a conventional device which outputs a deflection wave (see FIGS. 5A and 5B) scanning the electron beam in a horizontal direction when the video signals of primary colors R, G and B are read.

A horizontal correcting wave generating circuit 3 is horizontal registration correcting means, and effects registration correction so as to vary the scanning start point of the electron beam in a horizontal direction when the video signals of primary colors R, G and B are read in synchronism with the outputs of the encoder 7 corresponding to the positions of the filter portions R, G and B, and thereby eliminate horizontal color misregistration. In the circuit 3, there are three memories in which are stored correction data (corresponding to DC in FIG. 5A) for the video signals of primary colors R, G and B, and these correction data are set by a keyboard 8. Each memory can store therein correction data corresponding to the number of picture elements in one horizontal scanning line, and can store therein different correction data for each picture element, but in FIG. 5A, it is to be understood that the same data as all picture elements are stored in the memory for the color B and no correction data are stored in the memories for R and G. The correcting wave generating circuit 3 outputs to an adder 5 a signal varying in accordance with the data stored in each memory.

The horizontal correcting wave generating circuit 3 outputs a correcting waveform on the basis of correction data conforming to the memories contained therein, and the adder 5 adds this correcting waveform to the deflection waveform of the horizontal deflection wave generating circuit 4 and outputs it to the image pickup device 1.

A vertical direction correcting circuit 9 is comprised of a vertical deflection wave generating circuit, a vertical correcting wave generating circuit and an adder. The vertical deflection wave generating circuit is a conventional device which outputs to the image pickup device 1 a vertical deflection waveform for moving the position of the electron beam relative to R, G and B in a vertical direction. The vertical correcting wave generating circuit is vertical registration correcting means, and effects registration correction so as to vary the scanning start point of the electron beam in a vertical direction when the video signals of primary colors R, G and B are read in synchronism with the outputs of the encoder 7 corresponding to the positions of the filter portions R, G and B, and thereby eliminate color misregistration in the vertical direction. The vertical correcting wave generating circuit has therein three memories storing therein correction data (corresponding to DC in FIG. 5C) for the video signals of primary colors R, G and B, and these correction data are set by the keyboard 8. Each of the three memories in the vertical correcting wave generating circuit can store therein correction data corresponding to the number of horizontal scanning lines in one field, and can store therein different correction data for each horizontal scanning line.

Figure 5B:
FIGS. 5B and 5C show a deflection waveform for the vertical registration correction according to the present invention.
Figure 5C:
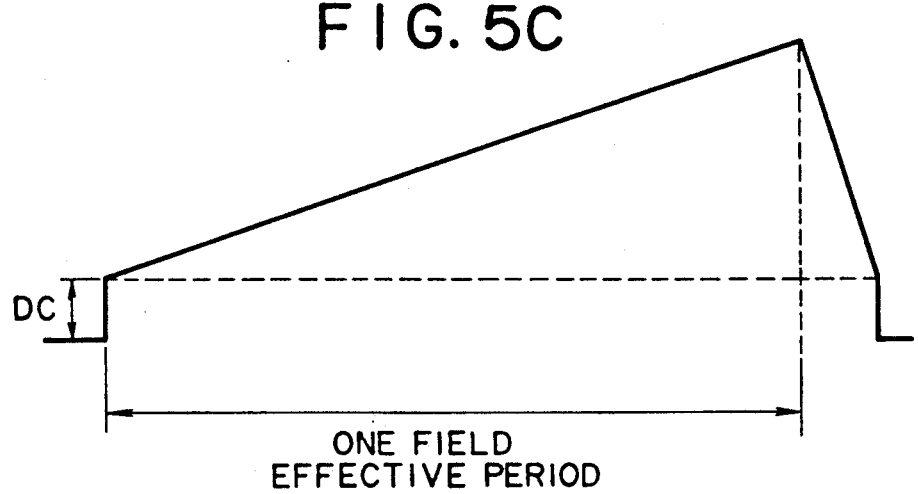
Figure 6:
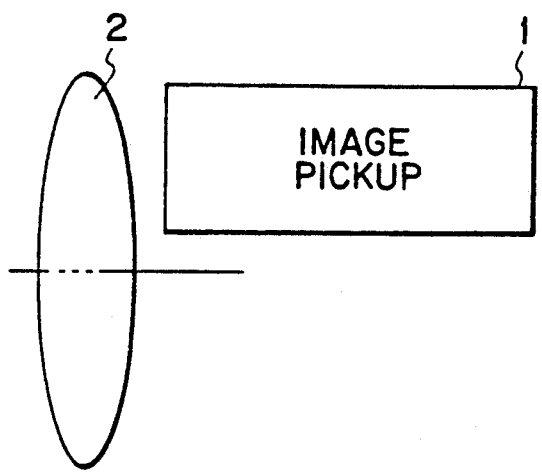
FIG. 6 illustrates a successive plane type color camera according to the prior art.
Figure 7:
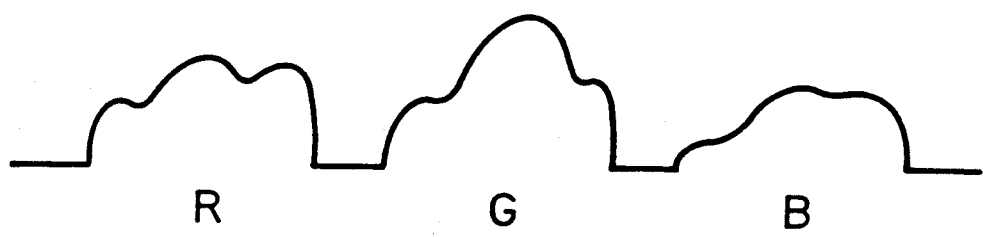
FIG. 7 shows a video signal output waveform in the camera of FIG. 6.

The adder in the circuit 9 adds the outputs from the vertical deflection wave generating circuit and the vertical correcting wave generating circuit and outputs them as the waveform of FIG. 5B to the image pickup device 1. Incidentally, one field effective period in FIG. 5B corresponds to the scanning period of the electron beam in one field.

A recording part 10 records the video signals of R, G and B of the image pickup device 1 on a medium.

Description will now be made of the registration correcting operation by the embodiment of FIG. 1.

Figure 2:
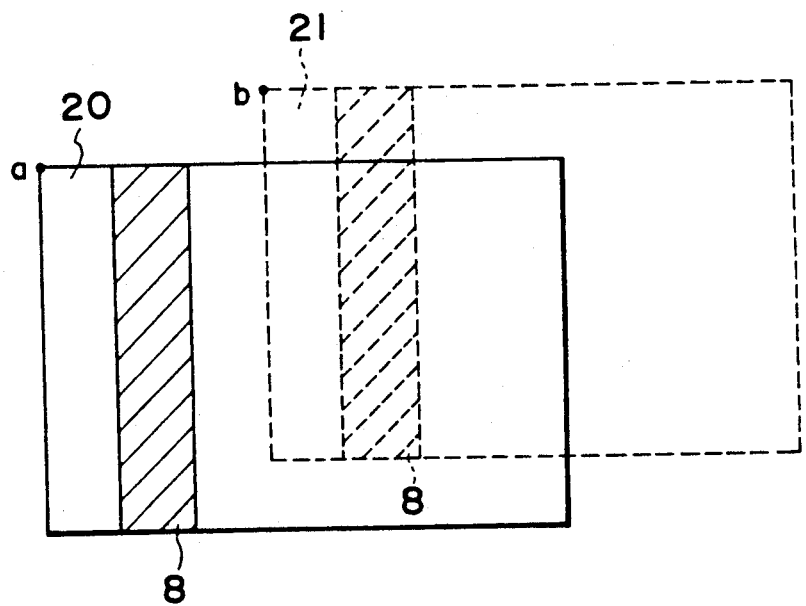
FIG. 2 illustrates color misregistration caused on the image pickup surface of FIG. 1.

FIG. 2 is an illustration of the object image 8 on the image pickup surface of the image pickup device 1 as it is seen from the rotatable filter 2 side, and shows a state in which the image has been picked up while being shifted rightwardly by B picture plane 21 relative to R and G picture plane 20 due to the mounting deviation of the rotatable filter 2 on the rotary shaft and the difference in the thickness of the filter. In FIG. 2, showing is made with some deviation also in the vertical direction to clarify the deviation of the picture plane in the horizontal direction.

Figure 3A:
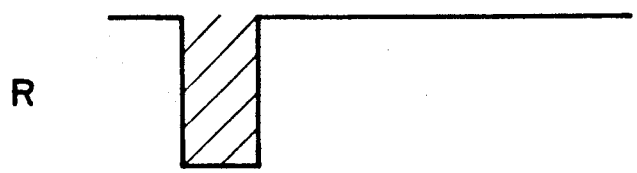
FIGS. 3A, 3B and 3C show video signal output waveforms having color misregistration during ordinary scanning.
Figure 3B:
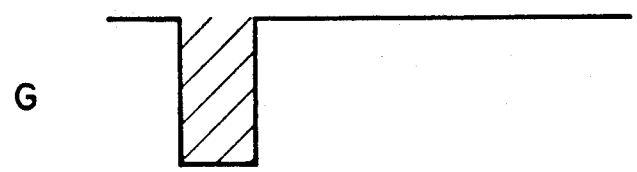
Figure 3C:
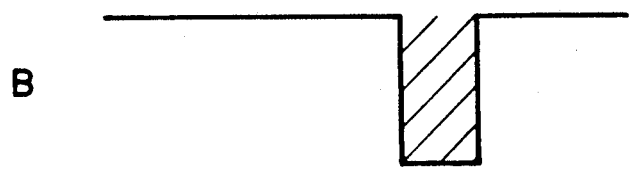

FIGS. 3A, 3B and 3C show the video signals of primary colors R, G and B obtained by reading the picture plane having the color misregistration shown in FIG. 2. As shown, the positions of the object image indicated by the hatchings of the signals R and G do not deviate from each other, while the object image of the signal B deviates and as a result, there occurs color misregistration during reproduction.

For such deviation of the B picture plane 21 relative to the R and G picture plane 20, in the present invention, the scanning start point is changed from from a point a to a point b only during the reading of the B picture plane 21. The scanning when the B picture plane 21 is read may be identical in scanning frequency and effective period to the scanning when the R and G picture plane 20 is read.

Figure 4A:
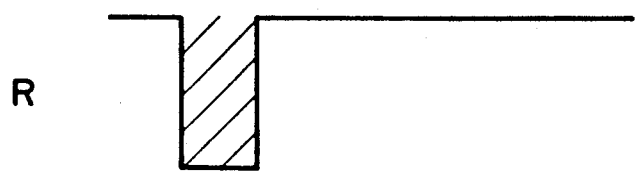
FIGS. 4A, 4B and 4C show video signal output waveforms corrected by the present invention.
Figure 4B:
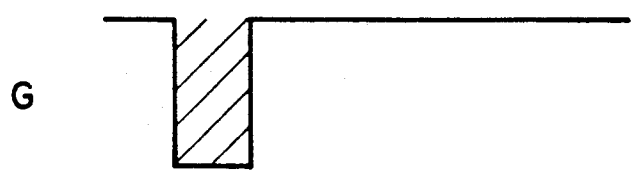
Figure 4C:
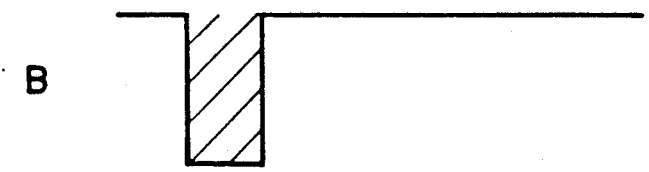

By such change of the scanning start point, the video signal output becomes such that as shown in FIGS. 4A, 4B and 4C, the positions of the object image are all the same in the R, G and B picture planes.

Here, in the embodiment of FIG. 1, an image pickup tube is used as the image pickup device 1 and therefore, paying attention to the deflection waveform of the image pickup tube, as shown in FIG. 5, in contrast with the deflection waveform during the reading of the R and G picture plane 20, a predetermined DC voltage DC corresponding to the amount of deviation of the picture plane is superposed on the deflection waveform during the reading of the B picture plane 21. That is, the correcting wave generating circuit 3 of FIG. 1 adds the DC voltage to the deflection waveform from the deflection wave generating circuit 4 by the adder 5 correspondingly to the amount of deviation of the B picture plane 21 of FIG. 2, and changes the start of reading and scanning from the point a on the R and G picture plane 20 to the start of reading and scanning from the point b.

Although in the embodiment of FIG. 1, an image pickup tube is used as the image pickup device 1, a solid state image pickup element which is a two-dimensional image sensor of CCD can also be used as the image pickup device 1, and where a solid state image pickup element is used, the position of the image pickup surface of the solid state image pickup element may be physically moved by the driving control of a piezo-electric element and the scanning start point may be spatially varied.

Further, where a two-dimensional image sensor of CCD is used, design may be made such that video signals are output by charges in some of a plurality of light receiving portions of the two-dimensional image sensor. In this case, the light receiving surfaces of the image sensor are wider than the area corresponding to the actually recorded video signal, and design is made such that all charges corresponding to one line of the two-dimensional image sensor in the horizontal direction are transferred to a horizontal transfer portion and only a signal corresponding to the necessary area is output from the horizontal transfer portion to the recording part.

Furthermore, in the present embodiment, design is made such that signals conforming to the data stored in the memories of the correcting wave generating circuit for the horizontal direction and the vertical direction are output, but with regard to the horizontal direction, where the correction data during one horizontal scanning period are fixed, correction may be effected, for example, by a variable resistor, and likewise, with regard to the vertical direction, where the correction data during one field period are fixed, correction may be effected by a variable resistor.

Still furthermore, depending on the mounting angle of the rotatable filter 2 and the flatness of the rotatable filter itself, it happens that the degree of color misregistration on one image pickup surface is not constant. To correct this in a successive plane type color camera using an image pickup tube as the image pickup device 1, in addition to a DC signal, an AC signal is added to the deflection waveform and by the AC signal, the start position of each scanning line in one picture plane is changed and further, registration correction conforming to the location in one horizontal period becomes possible, whereby different color misregistration for each horizontal scanning line of the same color video signal output in one picture plane can be made constant. That is, during the reading of R, G and B picture planes, an AC signal component may be independently imparted to the deflection waveform so that the degree color misregistration may become constant in all picture planes, whereafter a DC signal component may be added to thereby correct the color misregistration between the picture planes.

As described above, according to the present invention, by independently controlling the reading start points of R, G and B picture planes, there can be obtained primary color video signals which are free of color misregistration between R, G and B picture planes and to which has been subjected to registration correction. Further, by likewise independently controlling the reading start point with regard to each horizontal scanning line in the same color picture plane, there can be accomplished registration correction which also eliminates color misregistration between the scanning lines in the same color picture plane.

What is claimed is:

1. A color camera comprising:
   an image pickup tube;
   means for generating as an output a horizontal deflection signal for moving an electron beam of said image pickup tube in a horizontal direction and a vertical deflection signal for moving the electron beam of said image pickup tube in a vertical direction;
   a rotatable filter disposed between said image pickup tube and an object to be photographed, the filter having plural filter portions, each filter portion being of a color different from some other filter portions;
   means for rotating said rotatable filter, said image pickup tube outputting video signals corresponding to said colors in accordance with the rotational position of said filter; and
   means for adjusting a scanning area of said image pickup tube in a horizontal direction or in a vertical direction for each of said colors by adjusting said horizontal deflection signal or said vertical deflection signal, respectively.

2. A color camera comprising:
   an image pickup device;
   a rotatable filter disposed between said image pickup device and an object to be photographed, the filter having plural filter portions, each filter portion being of a color different from some other filter portions;
   means for rotating said rotatable filter; and
   a registration correcting means for adjusting a scanning area of said image pickup device for each of said colors and thereby correcting registration of images picked up by said image pickup device corresponding to respective colors.

3. A color camera according to claim 2, wherein said image pickup device is an image pickup tube and said registration correcting means has a deflection signal output means for outputting a deflection signal to said image pickup tube and a correcting means for correcting said deflection signal.

* * * * *